United States Patent
Makino

(10) Patent No.: US 6,635,841 B2
(45) Date of Patent: Oct. 21, 2003

(54) METAL-CERAMIC COMPOSITE AND VACUUM SWITCH UNIT USING THE SAME

(75) Inventor: Yusuke Makino, Aichi (JP)

(73) Assignee: NGK Spark Plug Co., Ltd., Aichi (JP)

(*) Notice: Subject to any disclaimer, the term of this patent is extended or adjusted under 35 U.S.C. 154(b) by 7 days.

(21) Appl. No.: 09/995,735

(22) Filed: Nov. 29, 2001

(65) Prior Publication Data

US 2002/0092830 A1 Jul. 18, 2002

(30) Foreign Application Priority Data

Nov. 30, 2000 (JP) ........................................ 2000-365393

(51) Int. Cl.$^7$ ................................................ H01H 33/66
(52) U.S. Cl. ..................... 218/134; 428/210; 156/89.12
(58) Field of Search ................... 428/210, 450; 156/89.12; 218/118, 134, 137, 155

(56) References Cited

U.S. PATENT DOCUMENTS 6,506,481 B2 * 1/2003 Makino et al. ............. 428/210
6,534,738 B2 * 3/2003 Makino ....................... 218/118

FOREIGN PATENT DOCUMENTS

| JP | 52-59863 | 5/1977 | ......... H01H/331/66 |
| JP | 7-172946 | 7/1995 | ............ C04B/37/02 |
| JP | 2002-167285 | * 6/2002 | |

* cited by examiner

Primary Examiner—Lincoln Donovan
(74) Attorney, Agent, or Firm—Sughrue Mion, PLLC

(57) ABSTRACT

A metal-ceramic composite is provided in which a solder layer and a ceramic member are held in contact with each other at an annular area extending along an entire circumference of an axial end surface of the ceramic member and having an average width W (mm), and in which the average width W and an outer diameter D (mm) of the ceramic member satisfy $D \geq 30$ and $(1/6) \times D \geq W \geq (D/30)+2.6$.

7 Claims, 3 Drawing Sheets

US 6,635,841 B2

METAL-CERAMIC COMPOSITE AND VACUUM SWITCH UNIT USING THE SAME

BACKGROUND OF THE INVENTION

The present invention relates to metal-ceramic composites Further, the present invention relates to a vacuum switch unit using a metal-ceramic composite.

A vacuum switch unit is widely used as a switch for selectively switching a supply of current for thereby controlling application of high voltage. The vacuum switch unit includes a ceramic casing within which contacts are disposed and which is evacuated for the purpose of preventing a spark from being caused by interruption of the current for thereby attaining a sufficient insulation. In a general structure of such a vacuum switch unit, the ceramic casing consists of a hollow, cylindrical ceramic member and metallic cover members closing the opposite ends of the cylindrical ceramic member. The metallic cover members are soldered to the ceramic member to constitute a metal-ceramic composite.

As a structure for joining a metallic member to an axial end surface of a cylindrical ceramic member while providing a hermetic seal between them, there are known a so-called edge seal structure and a butt seal structure as disclosed in Japanese Patent Provisional Publication No. 52-59863. The former is to join an axial end surface of a hollow, cylindrical metallic member to an axial end surface of a hollow, cylindrical ceramic member by interposing therebetween solder. The latter is to provide the hollow, cylindrical metallic member with an annular flange extending radially outward from an axial end thereof, place the annular flange on the axial end surface of the ceramic member and join them by interposing therebetween solder. In production of the conventional vacuum switch unit or the like, the edge seal structure or butt seal structure is selectively used without relation to the outer diameter and the thickness of the ceramic member. For example, Japanese Patent Provisional Publication No. 52-59863 discloses that a good metal-ceramic composite with few defects can be obtained by forming the metallic member from kovar or the like alloy of low expansion coefficient and without relation to which one of the edge seal structure and the butt seal structure is employed. Further, Japanese Patent Provisional Publication No. 7-172946 discloses that a good metal-ceramic composite can be obtained by controlling the ratio of the thickness of the ceramic member to the thickness of a joining portion of the metallic member and further controlling the linear expansion coefficients of the materials and the melting point of solder, on condition that the butt seal structure is employed.

SUMMARY OF THE INVENTION

Even if the techniques disclosed by the above described Japanese Patent Provisional Publications are taken into consideration, the production of a metal-ceramic composite still encounters a problem that a defective product which is extremely low in the joining strength is liable to be produced in case the articles to be produced differ in the outer diameter of the ceramic member from one to another and depending upon which one of the seal structures is employed, since a stress concentrates at a particular place of a joining portion at the time of cooling after soldering due to a difference in linear expansion coefficient between the ceramic member and the metallic member.

It is accordingly an object of the present invention to provide a metal-ceramic composite in which a crack or the like defect is hard to be caused in the joining portion thereof and which has a high joining strength.

It is a further object of the present invention to provide a vacuum switch unit using a metal-ceramic composite of the foregoing character.

To accomplish the above objects, there is provided according to an aspect of the present invention a metal-ceramic composite comprising a hollow, cylindrical ceramic member having an axial end surface, a metallic member having a flat plate portion extending along an entire circumference of the axial end surface of the ceramic member, the metallic member being disposed so that a main surface of the plate portion is positioned opposite to the axial end surface of the ceramic member, and a joining metal layer interposed between the main surface of the metallic member and the axial end surface of the ceramic member and joining the metallic member and the ceramic member together so as to form a butt seal structure, wherein the joining metal layer and the ceramic member are in contact with each other at an annular area extending circumferentially of the axial end surface of the ceramic member and having an average width W (mm), and wherein the average width W and an outer diameter D (mm) of the ceramic member satisfy $D \geq 30$ and $(1/6) \times D \geq W \geq (D/30)+2.6$.

According to another aspect of the present invention, there is provided a vacuum switch unit comprising a metal-ceramic composite defining therewithin a closed space, and a pair of switch electrodes having contacts which are disposed within the closed space and movable toward and away from each other, the metal-ceramic composite including a hollow, cylindrical ceramic member having opposite axial end surfaces, a pair of metallic closure members closing the respective opposite axial end surfaces, each of the metallic closure members having a flat plate portion extending along an entire circumference of each of the axial end surfaces of the ceramic member, each of the metallic closure members being disposed so that a main surface of the plate portion is positioned opposite to each of the axial end surfaces of the ceramic member, and a pair of joining metal layers, each of the joining metal layers being interposed between the main surface of each of the metallic closure members and each of the axial end surfaces of the ceramic m and joining each of the metallic closure members and the ceramic member together so as to form a butt seal structure, wherein each of the joining metal layers and the ceramic member are in contact with each other at an annular area extending circumferentially of each of the axial end surfaces of the ceramic m and having an average width W (mm), and wherein the average width W and an outer diameter D (mm) of the ceramic member satisfy $D \geq 30$ and $(1/6) \times D \geq W \geq (D/30)+2.6$.

DESCRIPTION OF THE PREFERRED EMBODIMENT

Figure 1:
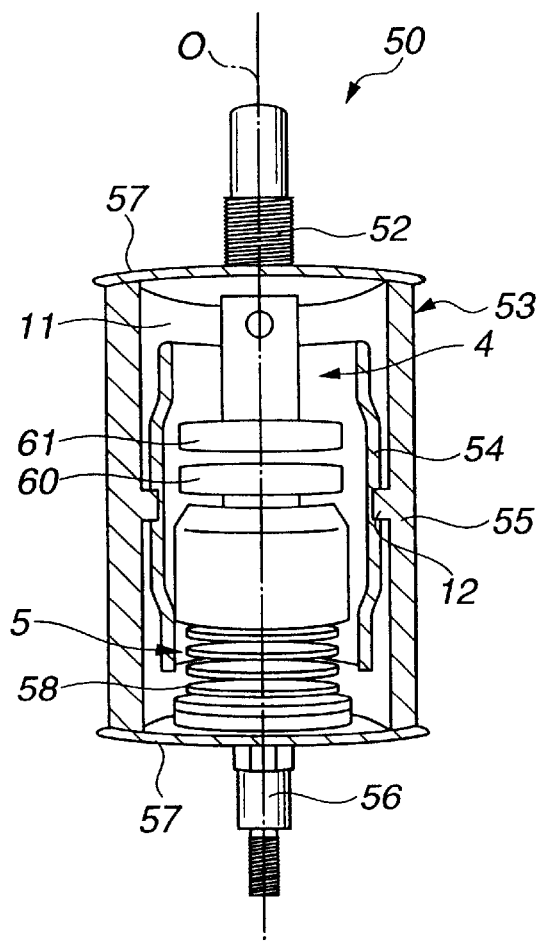
FIG. 1 is a sectional view of a vacuum switch in which a metal-ceramic composite according to the present invention is incorporated.

Referring to FIG. 1, a vacuum switch unit having a metal-ceramic composite according to an embodiment of the present invention is generally indicated by 50. The vacuum switch unit 50 includes a casing 53 including a hollow, cylindrical ceramic member 55. Within the ceramic member 55 is disposed a cylindrical shielding member 54 which is hollow, cylindrical and made of metal. On the inner circumferential surface of the ceramic member 55 is formed an annular projection 12 elongated circumferentially of the ceramic member 55. To the inner circumferential surface of the annular projection 12 is joined the outer circumferential surface of the shielding member 54 by way of a solder layer (not shown). The ceramic member 55 is made of, for example, alumina ceramic (e.g., ceramic containing 92 wt % of alumina), and its outer surface is covered by a glaze layer (not shown).

Figure 2:
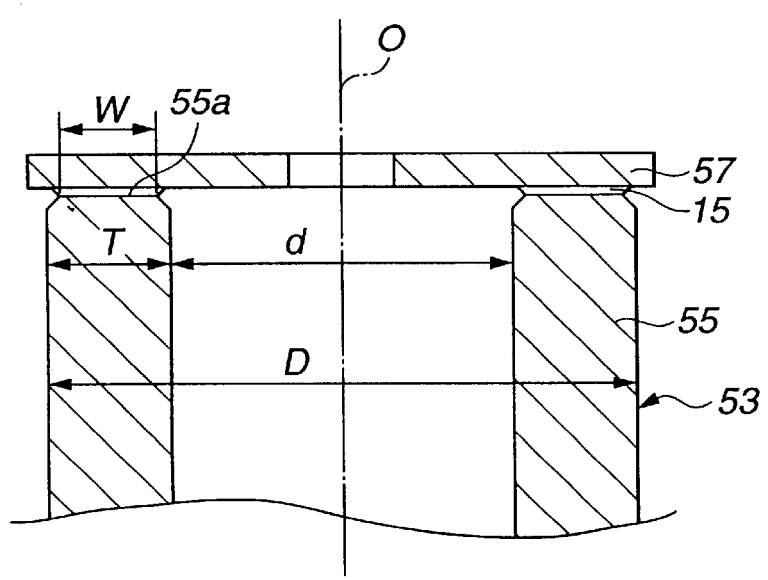
FIG. 2 is a schematic, fragmentary sectional view of a metal-ceramic composite wherein a ceramic member and a metallic member are joined so as to form a butt seal structure.

The opposite axial ends of the ceramic member 55 are closed by metallic cover members 57 and 57 so that a closed space 11 is formed within the ceramic member 55. The metallic cover members 57 and 57 are soldered to the opposite axial end faces of the ceramic member 55 so as to constitute the butt seal structures, respectively. As shown in FIG. 2, the metallic cover members 57 and 57 are generally in the form of a circular plate, so that the outer peripheral potions of the metallic cover members 57 and 57, which are located opposite to the axial end surfaces 55a of the ceramic member 55, are disposed so as to extend along the entire circumference of the axial end surfaces 55a. Each metallic closure member 57 has on one side and at an outer peripheral portion thereof a main surface at which it is soldered to the axial end surface 55a of the ceramic member 55 by way of a joining metal or solder layer 15 so as to constitute the butt seal structure.

In the meantime, the metallic cover members 57 and 57 are made of Fe—Ni—Co alloy, e.g., kovar (trade name; Fe—Ni—Co alloy containing 29 wt % Ni, 17–18 wt % Co and the remainder Fe). However, the metallic cover members 57 and 57 may otherwise be made of stainless steel, Cu alloy, etc. The solder layer 15 is made of Ag—Cu alloy so that a reaction layer resulting from reaction of an active metal component (e.g., Ti or the like) with ceramic is formed between the ceramic member 55 and the solder layer 15.

Then, inside the closed space 11 is disposed a stationary electrode 4 which extends through one metallic cover member 57. The stationary electrode 4 has a stationary side terminal portion 52 on a first end side which is located outside of the closed space 11. On the other hand, the stationary electrode 4 has a stationary side switch contact 61 on a second end side which is located within the closed space 11. Further, a movable electrode 5 is provided which extends through the other metallic cover member 57 and is movable axially along the axial direction O of the cylindrical ceramic member 55. The movable electrode 5 has on a first end side which is located outside the closed space 11 a movable side terminal portion 56 and on a second end side which is located within the closed space 11 a movable side switch contact 60 which is movable toward and away from the stationary switch contact 61 for thereby being brought into contact with or out of contact from the same. The shielding member 54 is disposed within the ceramic member 55 so as to surround the stationary side switch contact 61 and the movable side switch contact 60. The movable side electrode 5 has a metal bellows 58 which contracts and expands to move the movable side contact 60 toward and away from the stationary side contact 61.

Figure 3:
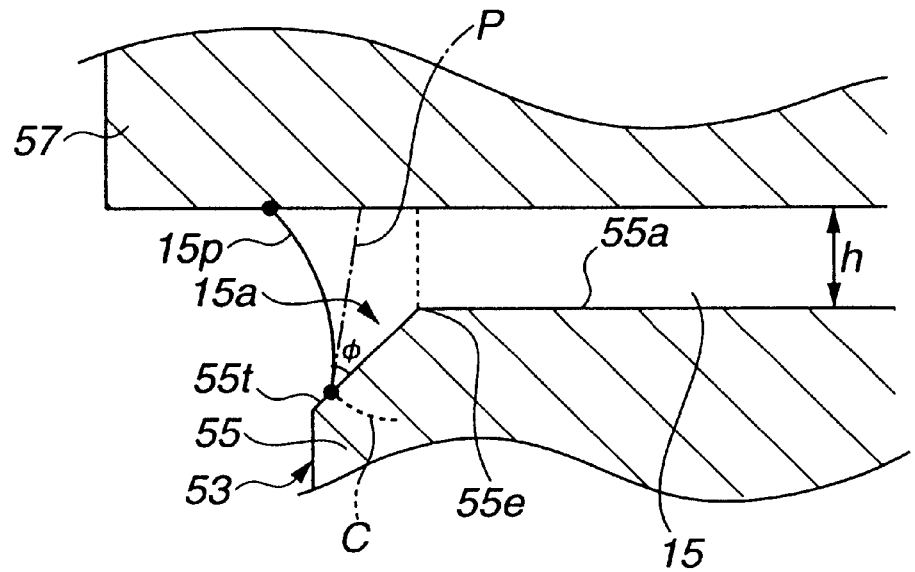
FIG. 3 is an enlarged view of a joining portion of the metal-ceramic composite of FIG. 2.
Figure 4A:
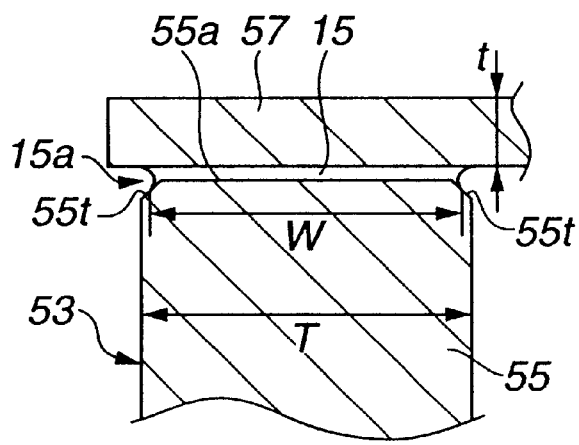
FIGS. 4A and 4B are schematic, fragmentary sectional views of a portion of the metal-ceramic composite of FIG. 2 for illustrating how the width W of a joining area affects on a joint between a ceramic member and a metallic member which are joined so as to constitute a butt seal structure.
Figure 4B:
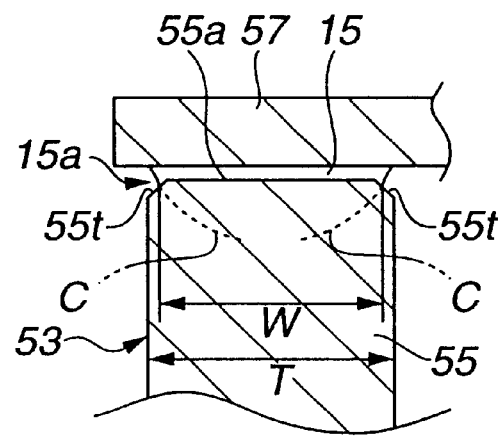

Referring to FIGS. 3 and 4A and 4B, the solder layer 15 has an ring-shaped or annular joining area of an average radial width W (mm), at which it is brought into contact with the axial end surface 55a of the cylindrical ceramic member 55. The average width W (mm) and the outer diameter D (mm) (refer to FIG. 2) of the cylindrical ceramic member 55 are determined so as to satisfy:

$$D \geq 30 \tag{1}$$

and $$(1/6) \times D \geq W \geq (D/30) + 2.6 \tag{2}$$

Further, at the inner and outer peripheral edges of the axial end surface 55a of the cylindrical ceramic member 55 are formed chamfers 55t and 55t. In this connection, only one chamfer 55t can be formed at either of the inner and outer edges of the axial end surface 55a. In the meantime, the width W of the joining area of the solder layer (joining metal layer) 15 is decided with respect to a figure projected onto a plane of projection which is perpendicular to the center axis O of the cylindrical ceramic member 55 and so as to represent the width W measured along a line extending through and radially of the center axis O.

The meaning of the expression (2) will be described in detail hereinafter. According to the investigations conducted by the inventor, it was found that, as shown in FIG. 3, a crack or the like defect C of the cylindrical ceramic member 55 was liable to occur at a position adjacent the outer or inner edge of the joining area, at the time of cooling after soldering. Particularly, in case the solder layer 15 has an overlying portion 15a (i.e., a portion of the solder layer 15 which is located outside of a cylindrical surface having an axis coinciding with the axis O and including the inner peripheral edge 55e) laid over the chamfer 55t, the stress concentration became more pronounced and a crack or the like defect C was more likely to be caused as the overlying portion 15a became larger in volume. Thus, for preventing such a crack or the like defect C, it is important to make the overlying portion 15a smaller in volume.

As shown in FIG. 2, in case the butt seal structure is employed, the main surface of the metallic cover member 57 is positioned nearly in parallel with the entire axial end surface of the cylindrical ceramic member 55. Thus, the circumferential periphery 15p of the solder layer 15 extending between the main surface of the metallic closure member 57 and the outer periphery of the axial end surface 55a of the cylindrical ceramic member 55, i.e., the chamfer 55t is concavely curved when viewed in section. Assuming that a fillet angle Φ is an angle which is formed, in the section taken by the plane including the center axis of the cylindrical ceramic member 55, between the chamfer 55t and a tangent P which is tangential to the curved circumferential periphery 15p at the joint between the curved circumferential periphery 15p and the chamber 55t, the fillet angle Φ has a tendency to becoming large. In this instance, since the molten solder is partially pulled, at the time of soldering, toward the outer peripheral edge of the main surface of the metallic cover member 57, i.e., nearly in parallel with the axial end surface 55a of the cylindrical ceramic member 55, so that the solder is liable to flow to the chamfer 55t side and therefore the overlying portion 15a of the solder layer 15 is liable to become larger.

Thus, it is considered that in case the thickness T of the cylindrical ceramic member 55 is made smaller, i.e., the width W of the joining area is made smaller as shown in FIG. 4B, contraction of the solder layer 15 due to surface tension is not caused so much and therefore, as having described with reference to FIG. 3, the overlying portion 15a becomes larger in volume so that a crack or the like defect C is more likely to be caused. However, in case the thickness T of the cylindrical ceramic member 55 is large to some extent, i.e., the width W of the joining area is large to some extent as shown in FIG. 4A, the solder is expanded while becoming thinner. Thus, a contracting action of the molten solder due to surface tension becomes larger so that the overlying portion 15a does not become so large in volume. As having been described hereinbefore, by making the width W of the joining area larger than the lower limit value Wmin (=D/30+2.6), the volume of the overlying portion 15a can be made suitably small. As a result, it becomes possible to prevent a crack or the like defect due to stress concentration effectively and therefore it becomes possible to obtain a metal-ceramic composite having a high joining strength. In the meantime, the width W of the joining area is set at a value smaller than the upper limit Wmax which is expressed by Wmax=(⅙)×D (mm) so that an excess increase of the weight of the cylindrical ceramic member 55 and a lack of space for the closed space 11 are not caused.

Then, it is desirable to determine the thickness t (mm) of the metallic cover member 57 so as to satisfy (1/120)×D≦t≦3. When the thickness t exceeds 3 mm, stress concentration on the ceramic member 55 side due to contraction of the metallic member is increased so as to cause a crack or the like defect in some case. Further, when the thickness t of the metallic cover member 57 becomes smaller than (1/120)×D, it is difficult for the metallic cover member 57 to have a desired strength.

In the meantime, the metal-ceramic composite is not limited to use in the vacuum switch unit but can be applied to other devices, e.g., a heat exchanger.

EXAMPLE

Figure 5A:
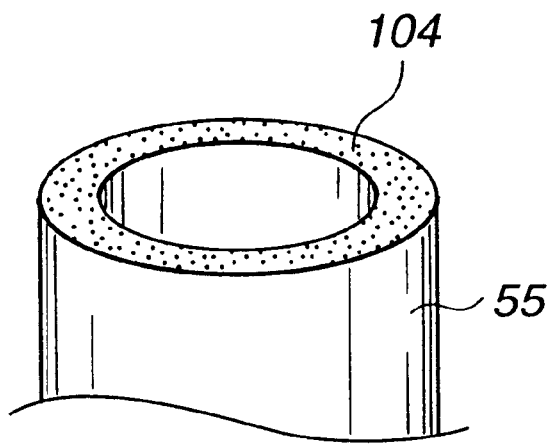
FIGS. 5A and 5B are views for illustrating processes for producing a butt seal structure.
Figure 5B:
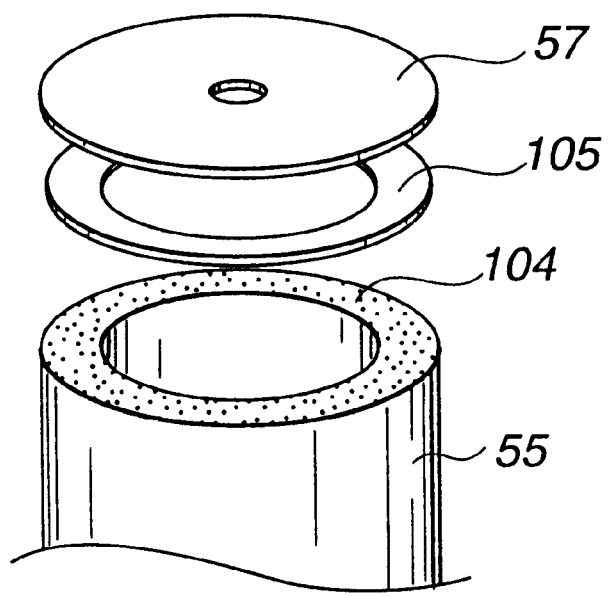

Sintered alumina bodies (i.e., sintered body made of ceramic containing 92 wt % Alumina) having various outer diameters D (mm) and various inner diameters d (mm) shown in Table 1 were prepared as the cylindrical ceramic member 55. Each sintered alumina body is formed with a chamfer of 0.25 mm at each of the inner and outer peripheral edges. Metallizing paste containing Mo—Mn alloy powder is applied to the opposite axial end surfaces of the cylindrical ceramic member and baked at the temperature of 1400° C. Thereafter, the metallized axial end surfaces of the cylindrical ceramic member 55 is electroplated with Ni to form a metallizing layer 104 as shown in FIG. 5A. As shown in FIG. 5B, the metallic closure member 57 made of kovar and of the thickness determined variously in accordance with the diameter is placed upon the axial end surface of the cylindrical ceramic member 55 by interposing therebetween a Ag—Cu eutectic solder (alloy containing 28 wt % Cu and the remainder Ag) film 105 and soldered thereto at the temperature of 830° C. to form the butt seal structure. In the meantime, the width W of the joining area is adjusted by the size of the solder film 105. The appearances of the joining portions of the thus obtained examples were observed to examine whether a crack or the like defect was caused in the cylindrical ceramic member 55. An example in which no crack or the like defect was found is indicated by ◯, an example in which cracks or the like defects were found though few is indicated by Δ, and an example in which a number of cracks or the like defects were found is indicated by X. The test result i s shown in Table 1.

From the test result, it will be seen that there is caused scarcely any crack or the like defect when the width W of the joining area is equal to or larger than Wmin=(D/30)+2.6 (mm). On the other hand, it will be seen that occurrence of a crack or the like defect is pronounced when the width W of the joining area is smaller than Wmin.

In the foregoing, it is to be noted that the present invention was made as a result of an elaborate investigation conducted by the applicant who noticed the relation between the joining structure (i.e., edge seal structure or butt seal structure) and the size of the ceramic member at the time of joining the metallic member to the cylindrical ceramic member by way of the joining metal layer. By this, it was found that in the ceramic member of the outer diameter of 30 mm or larger, which was widely used in the general vacuum switch unit (the above described condition (1)), a defect such as a crack or the like defect was liable to be caused at the inner and outer edges of the joining area of the cylindrical ceramic member in case the width of the joining area was relatively small as compared with the outer diameter D. As a result of a further investigation, it was found that such a crack or the like defect was more liable to be caused when, of the above described two seal structures, the butt seal structure was employed.

However, the edge seal structure inevitably requires the metallic member to have a hollow cylindrical portion at an end of which the metallic member is to be butt-joined to a ceramic member. Since a vacuum switch unit or the like device requires a metallic cover member for forming an enclosed inner space in addition to the metallic member having the hollow cylindrical portion, thus causing the necessity of an increased number of constituent parts and an increased man-hour, and therefore increasing the manufacturing cost. In contrast to this, the butt seal structure only requires, for example, a metallic member in the form of a cover to be joined to an axial end surface of a ceramic member by interposing therebetween a solder layer, Thus, the butt seal structure is relatively simpler and can reduce the man-hour, i.e., the butt seal structure has a feature which the edge seal structure does not have.

Thus, experiments were conducted only with respect to the butt seal structure for making further detailed investigations as to the conditions where the crack or the like defect was occurred. By this, it was found that in case the thickness of the ceramic member could be made larger to some extent with respect to the diameter D thereof and resultantly the width W of the joining area could be made equal to or larger than a certain limit value, specifically a lower limit value Wmin which is expressed by Wmin=D/30+2.6, a crack or the like defect was hard to be caused at the inner and outer ends of the joining area even when the butt seal structure was employed and therefore a metal-ceramic composite having a high joining strength was obtained. In this manner, the present invention was completed. Further, by applying such a composite to a vacuum switch unit, it becomes possible to increase the durability of the joining portion between the ceramic member and the metallic cover member, thus making it possible to obtain a vacuum switch unit having a long life and hard to cause a leakage. Further, decrease in the joining defect can make higher the yield rate considerably.

When the width W of the joining area became smaller than the above described Win, the above described defect of the joining portion was caused more frequently, thus leading to a lowered yield rate due to increase in the rate of occurrence of the defective product due to lack of strength at the joining portion, or the like. On the other hand, in case the width W of the joining area was larger than the upper limit value Wmax which was expressed by Wmax=(⅙)×D (mm), the thickness of the ceramic member was too larger as compared with the outer diameter D, thus causing an increase in the cost of material and the weight. Further, this caused, in case the ceramic member was used as a casing of a vacuum switch unit, a lack of the space for disposition of necessary parts such as electrodes.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

TABLE 1

| Example | Ceramic member | | | | | Metallic Member | Judgement from Appearance |
|---|---|---|---|---|---|---|---|
| | D (mm) | d (mm) | (D − d)/2 (mm) | W (mm) | (D/30) + 2.6 (mm) | t (mm) | |
| 1 | 60 | 46 | 7 | 6.5 | 4.6 | 2 | ○ |
| 2 | 60 | 48 | 6 | 5.5 | 4.6 | 2 | ○ |
| 3* | 60 | 51 | 4.5 | 4.0 | 4.6 | 2 | X |
| 4 | 120 | 102 | 9 | 8.5 | 6.6 | 3 | ○ |
| 5 | 120 | 104 | 8 | 8.0 | 6.6 | 3 | ○ |
| 6* | 120 | 107 | 6.5 | 6.0 | 6.6 | 3 | X |
| 7* | 120 | 104 | 8 | 8.0 | 6.6 | 3.3 | Δ |

Marked by * are the examples which are beyond the scope of the invention.

What is claimed is:

1. A metal-ceramic composite comprising:

a hollow, cylindrical ceramic member having an axial end surface;

a metallic member having a flat plate portion extending along an entire circumference of the axial end surface of the ceramic member, the metallic member being disposed so that a main surface of the plate portion is positioned opposite to the axial end surface of the ceramic member; and a joining metal layer interposed between the main surface of the metallic member and the axial end surface of the ceramic member and joining the metallic member and the ceramic member together so as to form a butt seal structure;

wherein the joining metal layer and the ceramic member are in contact with each other at an annular area extending circumferentially of the axial end surface of the ceramic member and having an average width W (mm); and wherein the average width W and an outer diameter D (mm) of the ceramic member satisfy:

$D \geq 30$; and $(⅙) \times D \geq W \geq (D/30) + 2.6$.

2. A metal-ceramic composite according to claim 1, wherein the plate portion of the metallic member has the thickness t (mm) which satisfies:

$(1/120) \times D \leq t \leq 3$.

3. A metal-ceramic composite according to claim 1, wherein the ceramic member constitutes a part of a casing of a vacuum switch unit.

4. A metal-ceramic composite according to claim 1, wherein the joining metal layer is made of solder.

5. A metal-ceramic composite according to claim 4, wherein the solder is Ag—Cu eutectic solder.

6. A metal-ceramic composite according to claim 1, wherein the ceramic member is made of alumina ceramic, and the metallic member is made of Fe—Ni—Co alloy.

7. A metal-ceramic composite according to claim 1, wherein the ceramic member has chamfers at inner and outer peripheral edges of each of the axial end surfaces.

* * * * *